(12) United States Patent
Lee et al.

(10) Patent No.: US 9,164,597 B2
(45) Date of Patent: Oct. 20, 2015

(54) ELECTRONIC PEN DEVICE

(75) Inventors: Bong-Gun Lee, Seoul (KR);
Jong-Kwon Ko, Gyeonggi-do (KR);
Hyun-Ji Park, Gyeonggi-do (KR)

(73) Assignee: Samsung Electronics Co., Ltd.,
Yeongtong-gu, Suwon-si, Gyeonggi-do
(KR)

( * ) Notice: Subject to any disclaimer, the term of this patent is extended or adjusted under 35 U.S.C. 154(b) by 724 days.

(21) Appl. No.: 13/343,823

(22) Filed: Jan. 5, 2012

(65) Prior Publication Data

US 2012/0268429 A1   Oct. 25, 2012

(30) Foreign Application Priority Data

Apr. 22, 2011   (KR) .................. 10-2011-0037673

(51) Int. Cl.
  *G06F 3/033*   (2013.01)
  *G06F 3/0354*  (2013.01)

(52) U.S. Cl.
  CPC ............................ *G06F 3/03542* (2013.01)

(58) Field of Classification Search
  None
  See application file for complete search history.

(56) References Cited

U.S. PATENT DOCUMENTS

| | | | | |
|---|---|---|---|---|
| RE35,016 | E | * | 8/1995 | Gullman et al. ......... 73/862.041 |
| 5,977,959 | A | * | 11/1999 | Katsurahira et al. .......... 345/179 |
| 6,830,404 | B2 | * | 12/2004 | Nagaoka ........................ 401/258 |
| 2005/0190152 | A1 | * | 9/2005 | Vaganov ........................ 345/157 |
| 2007/0195069 | A1 | * | 8/2007 | Kable et al. .................... 345/179 |
| 2008/0170048 | A1 | * | 7/2008 | Hua ............................... 345/179 |
| 2011/0169775 | A1 | * | 7/2011 | Liaw et al. ..................... 345/175 |
| 2011/0242061 | A1 | * | 10/2011 | Liang et al. .................... 345/179 |
| 2011/0316815 | A1 | * | 12/2011 | Fang .............................. 345/179 |

* cited by examiner

*Primary Examiner* — Christopher R Lamb
(74) *Attorney, Agent, or Firm* — Cha & Reiter, LLC.

(57) ABSTRACT

An electronic pen device includes a pen body housing, a pen tip unit is provided inside the pen body housing and pressed in any of a plurality of directions via an external force, a light emitting device is provided inside the pen tip unit, and a switch unit is engaged with the pen tip unit and electrically contacts the pen tip unit, thus activating the light emitting device when the pen tip unit is pressed in any of the plurality of directions.

21 Claims, 5 Drawing Sheets

ELECTRONIC PEN DEVICE

CLAIM OF PRIORITY

This application claims priority under 35 U.S.C. §119(a) to a Korean Patent Application filed in the Korean Intellectual Property Office on Apr. 22, 2011 and assigned Serial No. 10-2011-0037673, the contents of which are incorporated herein by reference.

BACKGROUND OF THE INVENTION

1. Field of the Invention

The present invention relates to an electronic pen device, and more particularly, to an electronic pen device configured to make an electrical contact, when it is pressed in any direction.

2. Description of the Related Art

In general, an electronic blackboard projects an image of a projector onto a screen on which a user writes with an electronic pen device. The electronic blackboard is typically used during lectures or conferences.

The electronic pen device includes an electronic pen, a light emitting device within the electronic pen for emitting light, and an on/off switch for operating the light emitting device.

When the electronic pen is pressed against the screen for writing, the on/off switch is turned on and thus the light emitting device emits light. The screen detects the position of the electronic pen projecting the light during the writing mode.

If no pressure is applied to the electronic pen, the on/off switch maintains an off state and thus the light emitting device does not emit light. As a result, the position of the electronic pen is not detectable.

In the conventional electronic pen device, however, only when the electronic pen is pressed in a perpendicular direction to the screen, the on/off switch is turned on. On the other hand, if the electronic pen is pressed from any other direction on the screen, the on/off switch maintains the off state. As such, the light emitting device does not operate.

Accordingly, there exists a need for a device for operating a light emitting device and thus sensing emitted light even when an electronic pen is pressed on a screen from any direction irrespective of whether the direction is perpendicular to the screen or not.

SUMMARY OF THE INVENTION

An aspect of embodiments of the present invention is to address at least the problems and/or disadvantages and to provide at least the advantages described below. Accordingly, an aspect of embodiments of the present invention is to provide an electronic pen device configured to include a switch unit for electrically contacting a pen tip unit and thus operating a light emitting device, when the pen tip unit is pressed in any direction by an external force, so that writing on an electronic blackboard can be sensed irrespective of whether the electronic pen device is applied perpendicularly or not (e.g. in a tilted direction) on a screen of the electronic blackboard.

In accordance with an embodiment of the present invention, there is provided an electronic pen device in which a pen body housing is provided, a pen tip unit is provided inside the pen body housing and pressed in any of a plurality of directions by external force, a light emitting device is provided inside the pen tip unit, and a switch unit is engaged with the pen tip unit, and electrically contacts the pen tip unit and operating the light emitting device, when the pen tip unit is pressed in any of the plurality of directions.

BRIEF DESCRIPTION OF THE DRAWINGS

The above features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

Figure 1:
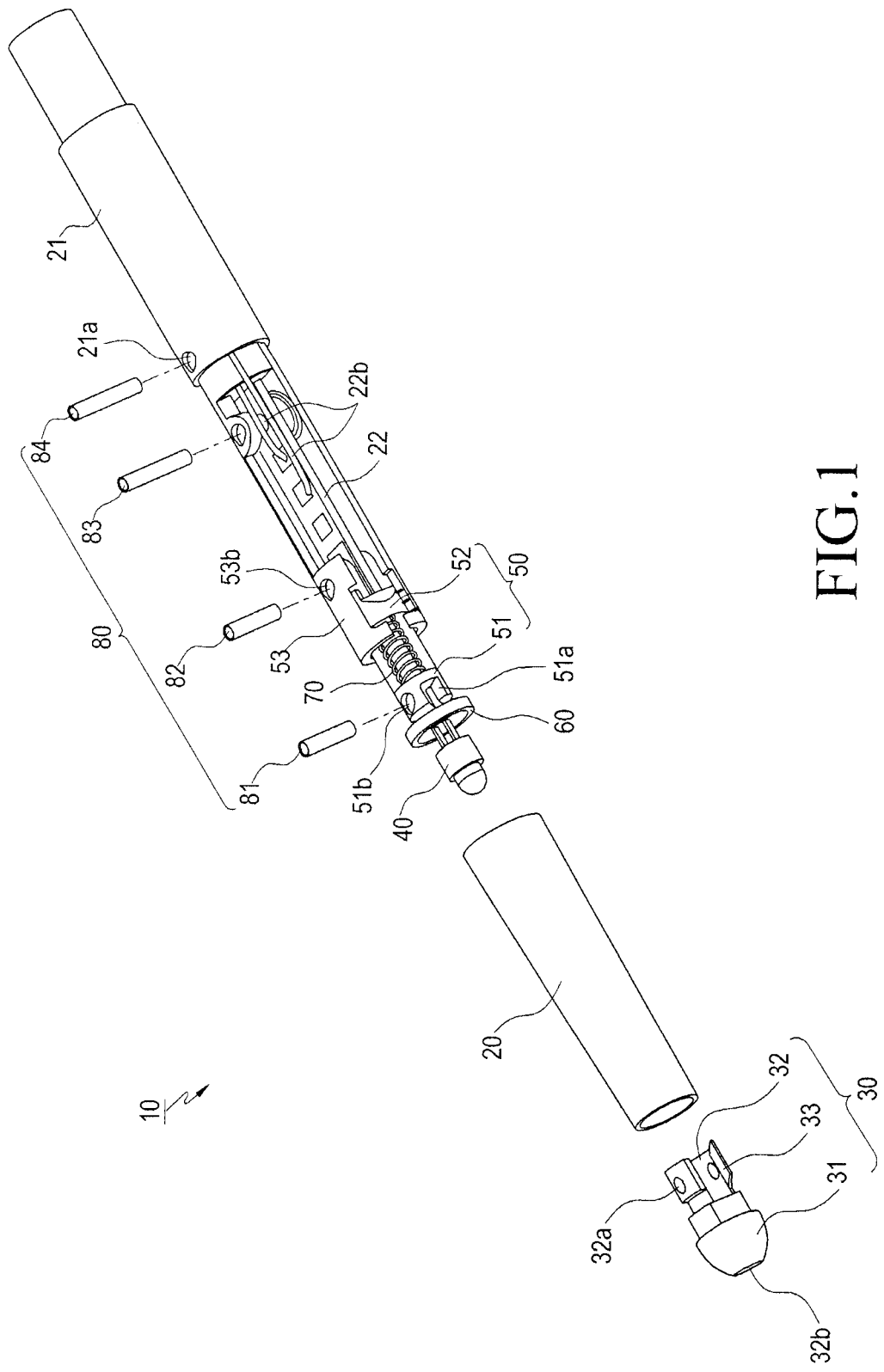
FIG. 1 is an exploded perspective view illustrating the structure of an electronic pen device according to an embodiment of the present invention.

Reference will now be made in detail to the preferred embodiment of the present invention with reference to the accompanying drawings. The detailed description, which will be given below with reference to the accompanying drawings, is intended to explain an exemplary embodiment of the present invention, rather than to show the only embodiment that can be implemented according to the invention. Thus, it will be apparent to those skilled in the art that many modifications can be made to the present invention within the scope and spirit of the present application.

Referring to FIGS. 1 to 7, an electronic pen device 70 includes a pen body housing 20, a pen tip unit 30, a light emitting device 40, and a switch 50. The pen tip unit 30, the light emitting device 40, and the switch 50 are contained inside the pen body housing 20. The pen tip unit 30 is provided at an end of the pen body housing 20 to be pressed in any of a plurality of directions A1 and A2. The light emitting device 40 is within the pen tip unit 30, for emitting light C1 when the switch unit 50 is turned on. The switch unit 50 is provided within the pen body housing 20, in engagement with the pen tip unit 30, for electrically contacting the pen tip unit 30 and thus operating the light emitting device 40, when the pen tip unit 30 is pressed in any of the directions A1 and A2.

Referring to FIG. 1, the pen body housing 20 includes a battery housing 21 and a Printed Circuit Board (PCB) 22. The battery housing 21 has a battery (not shown) built in it and is provided within the pen body housing 20 in order to supply power to the switch unit 50. The PCB 22 is within the pen body housing 20 to electrically connect the switch unit 50 to the battery.

Figure 2:
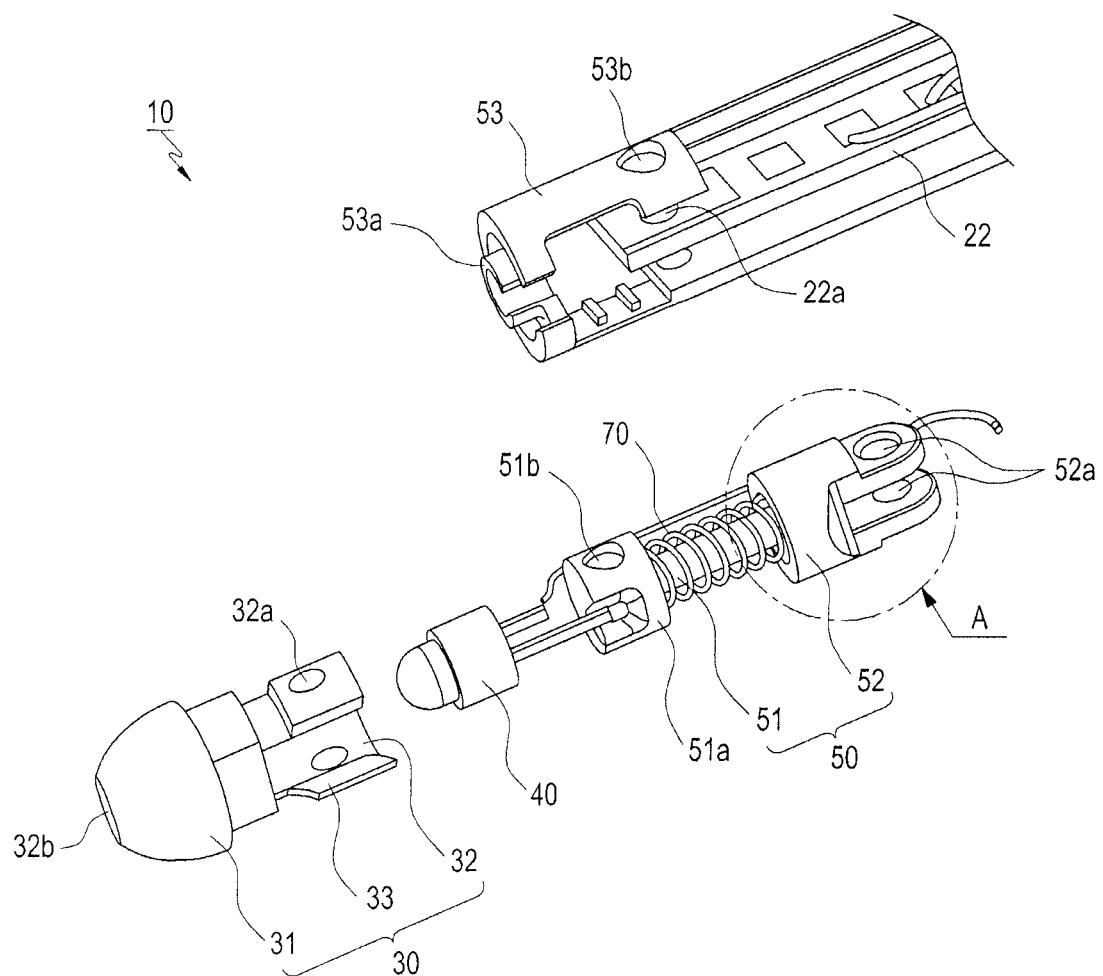
FIG. 2 is an enlarged exploded perspective view of a pen tip unit and a switch unit in the electronic pen device according to the embodiment of the present invention.
Figure 3:
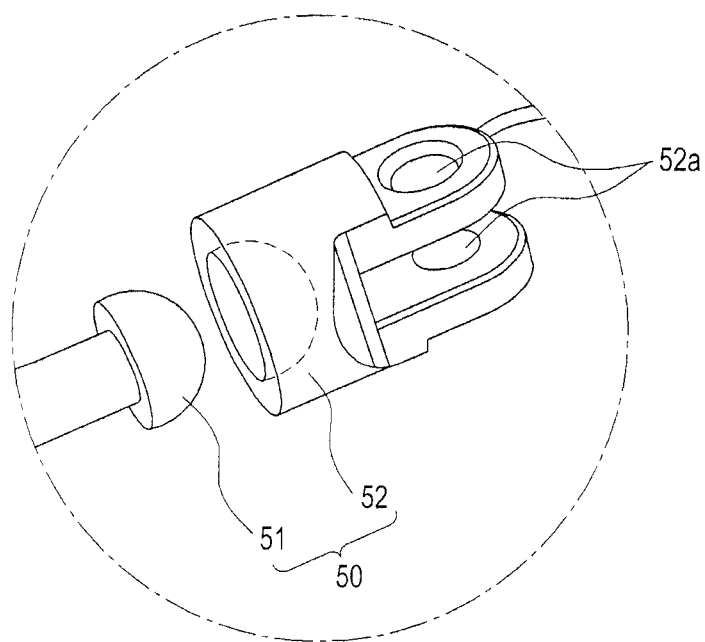
FIG. 3 is an enlarged exploded perspective view of a part A illustrated in FIG. 2.

Referring to FIGS. 1, 2 and 3, the pen tip unit 30 includes a semi-spherical contact portion 31, a mounting portion 32, and an engagement portion 33. The semi-spherical contact portion 31 is extended from an end of the pen body housing 20 to contact outside the pen body device 10 and to be pressed in any of the directions A1 and A2. The mounting portion 32 is formed in the contact portion 31 to receive the light emitting device 40. The engagement portion 33 is extended from the contact portion 31, for engagement with the switch unit 50.

Referring to FIGS. 1 to 7, a light-emitting hole 32b is formed into the mounting portion 32 for emitting the light C1 to the outside. A rubber portion 60 is circumferentially provided at the exterior of the engagement portion 33 to restrict pressure on the pen tip portion 30 and provide a frictional force.

Referring to FIGS. 1 to 7, the switch unit 50 includes a contact point head 51 and a contact point switch 52. The contact point head 51 is electrically connected to the light emitting device 40 and engaged with the pen tip unit 30, so that when the pen tip unit 30 is pressed in or from any of the directions A1 and A2 by an external force, the contact point head 51 makes a linear or rotational movement along with the pen tip unit 30. The contact point switch 52 is disposed at a position corresponding to the contact point head 51 to be brought into an electrical contact with the contact point head 51, thus activating the light emitting device 40 via the linear or rotational movement of the contact point head 51.

Referring to FIGS. 1, 2, 4 and 7, the switch unit 50 further includes a switch cover 53 for protecting the contact point head 51 and the contact point switch 52 and facilitates the linear or rotational movement of the contact point head 51. The switch cover 53 is provided with a guide 53a for guiding the linear or rotational movement of the contact point head 51. An elastic member 70 is disposed between the pen tip unit 30 and the switch cover 53 for providing an elastic force to allow the linear or rotational movement of the pen tip unit 30.

Referring to FIGS. 3 to 7, the contact point head 51 is shaped into a convex semi-sphere. The contact point switch 52 is also shaped into a concave semi-sphere so that it may be contactly engaged with the contact point head 51. Hence, the contact point 52 may also be brought into a contact with the contact point head 51 when the contact point head 51 makes a linear or rotational movement as the pen tip unit 30 is pressed in or from any of the directions A1 and A2.

Referring to FIGS. 4 to 7, the contact head point 51 is spaced apart from the contact point switch 52 by 0.2 to 0.3 mm. Yet, the gap between them may be 0.2 mm or smaller, or 0.3 mm or larger.

Referring to FIG. 1, the pen body housing 20 has one or more engagement pins 80 to combine the pen tip unit 30, the switch unit 50, the battery housing 21, the PCB 22, and the switch cover 53. The engagement pins 80 comprise first to fourth engagement pins 81, 82, 83 and 84. The first engagement pin 81 is penetrated into a first through hole 32a formed into the engagement portion 33 of the pen tip unit 30 and also into a second through hole 51b formed into a head engagement portion 51a in order to engage the engagement portion 33 of the pen tip unit 30 with the head engagement portion 51a of the contact point head 51. The second engagement pin 82 is penetrated into a switch hole 52a formed into the contact point switch 52, into a first cover hole 53b formed into the switch cover 53, and into a first PCB hole 22a formed into the PCB 22 in order to engage the contact point switch 52, the switch cover 53, and the PCB 22 with one another. The third engagement pin 83 is penetrated into a second cover hole 53c formed into the switch cover 53 and into a second PCB hole 22b formed into the PCB 22 in order to engage the switch cover 53 with the PCB 22. The fourth engagement pin 84 is penetrated into a housing hole 21a formed into the battery housing 21 and into a hole (not shown) formed into the switch cover 53 in order to engage the battery housing 21 with the switch cover 53.

Referring to FIGS. 4 to 7, when the pen tip unit 30 and the contact point head 51 move together as the pen tip unit 30 is pressed in or from any of the directions A1 and A2, the first engagement pin 81 bends the contact point head 51 so that the contact point head 51 may make a linear or rotational movement.

Referring to FIG. 1, the engagement pins 80 are "C"-shaped plate springs.

The light emitting device 40 includes an InfraRed (IR) Light Emitting Diode (LED). However, it should be noted that the light emitting device 40 may include other light source than an IR LED, for example, an IR diode or an ultrasonic device, etc.

Hereinafter, operations of the electronic pen device having the above-described configuration according to the embodiment of the present invention will be further described in great detail with reference to FIGS. 1 to 7.

Referring to FIGS. 1 to 7, the electronic pen device 10 includes the pen body housing 20, the pen tip unit 30, the light emitting device 40, and the switch unit 50.

Referring to FIG. 1, the battery housing 21 with the battery (not shown) built in it is provided at one end of the pen body housing 20. The PCB 22 is adjacent to the battery housing 21 and within the pen body housing 20. The switch cover 53 covers the PCB 22.

Referring to FIGS. 4 to 7, the switch cover 53 covers the contact point switch 50 of the switch unit 50, and the contact point switch 50 is electrically connected to the PCB 22. The contact point switch 52 is engaged with the contact point head 51 electrically connected to the light emitting device 40.

Referring to FIGS. 3 to 7, the contact point head 51 is shaped into a convex semi-sphere and engages with the contact point switch 53 shaped into a concave semi-sphere. Herein, the contact point head 51 is apart from the contact point switch 52 by 0.2 to 0.3 mm.

Referring to FIGS. 1, 2, 4 and 7, the elastic member 70 is interposed between the pen tip unit 30 and the switch cover 53. In this state, the light emitting device 40 is mounted on the mounting portion 32 of the pen tip unit 30, and the head engagement portion 51a of the contact point head 51 is engaged with the engagement portion 33 of the pen tip unit 30.

Referring to FIG. 1, the first engagement pin 81 is penetrated into the first through hole 32a formed into the engagement portion 33 of the pen tip unit 30 and also into the second through hole 51b formed into the head engagement portion 51a. The second engagement pin 82 is penetrated into the switch hole 52a formed into the contact point switch 52, into the first cover hole 53b formed into the switch cover 53, and into the first PCB hole 22a formed into the PCB 22. The third engagement pin 83 is penetrated into the second cover hole 53c formed into the switch cover 53 and into the second PCB hole 22b formed into the PCB 22. The fourth engagement pin 84 is penetrated into the housing hole 21a formed into the battery housing 21 and into the hole (not shown) formed into the switch cover 53.

The engagement pins 81 to 84 are "C"-shaped plate springs.

Referring to FIGS. 4 to 7, the pen tip unit 30 is combined with the switch unit 50, protruding from the pen body housing 20.

Figure 4:
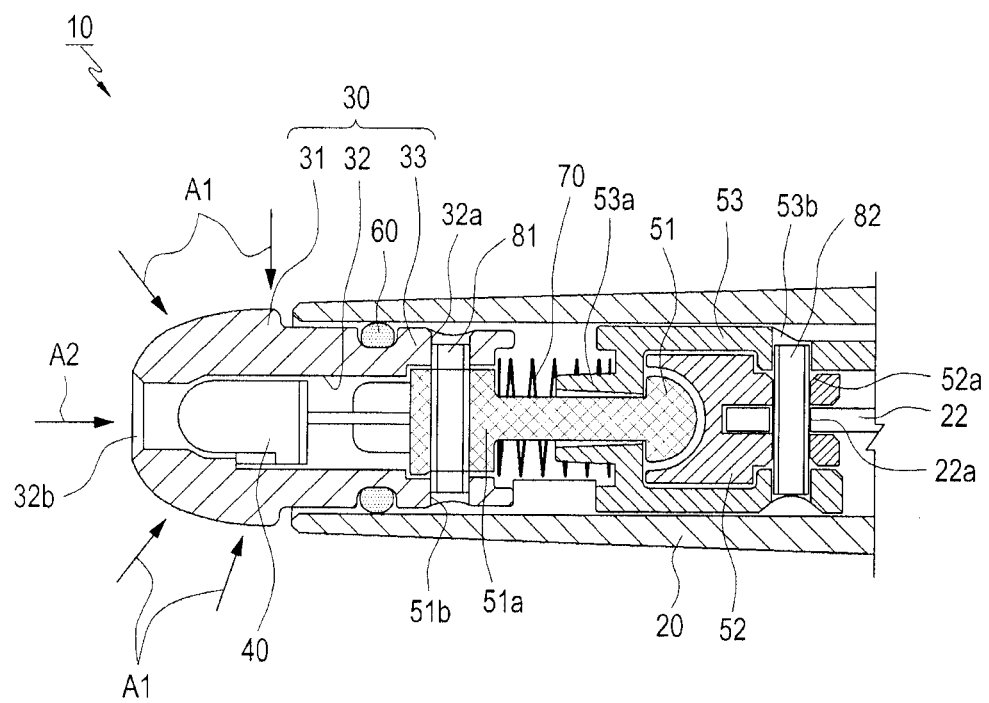
FIG. 4 is a side sectional view illustrating an assembled state of the electronic pen device according to the embodiment of the present invention.
Figure 6:
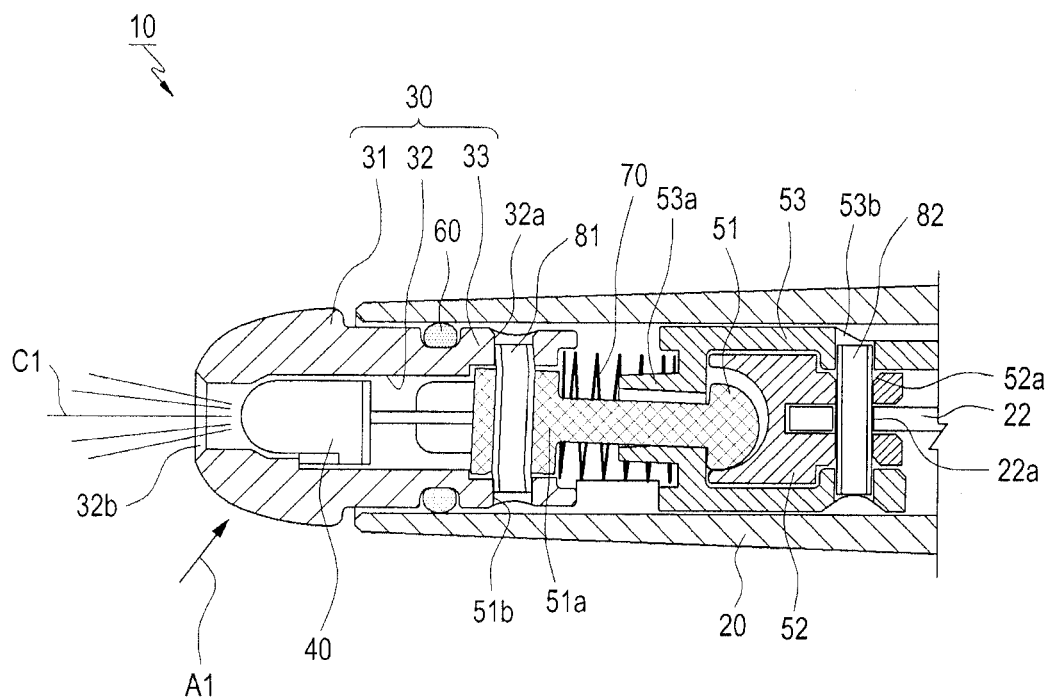
FIG. 6 is a side sectional view illustrating a state in which the electronic pen device is applied in a non-perpendicular direction according to the embodiment of the present invention.
Figure 7:
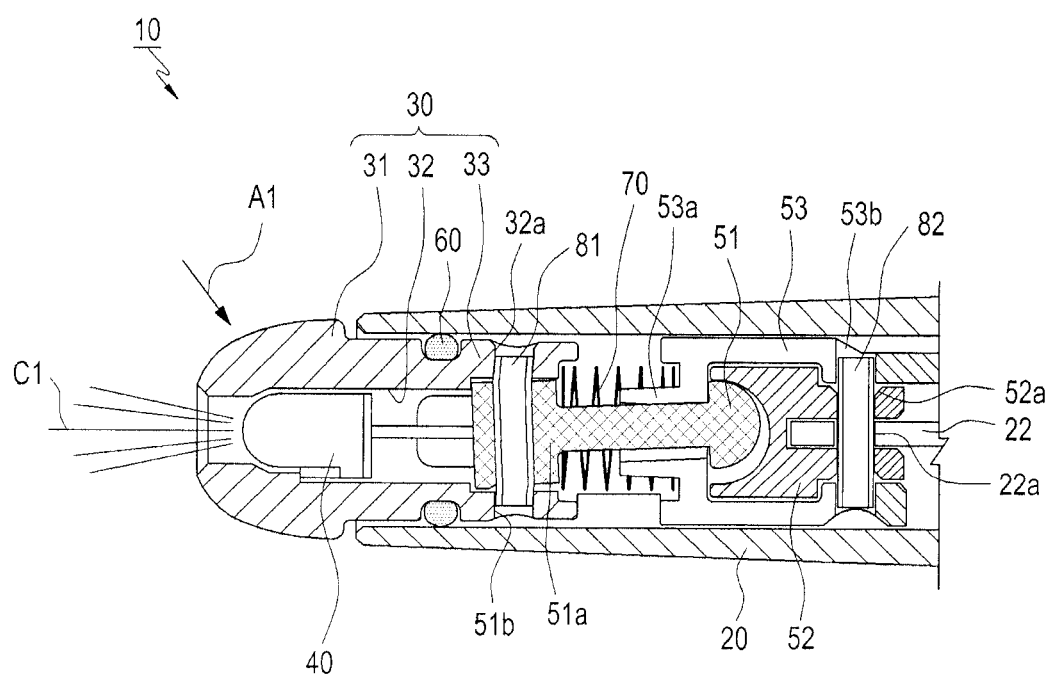
FIG. 7 is a side sectional view illustrating a state in which the electronic pen device is applied in another non-perpendicular direction according to the embodiment of the present invention.

Referring to FIGS. 4, 6 and 7, for hand-writing using the electronic pen device 10, a projector (not shown) projects an image onto a screen (not shown) and a user presses the pen tip unit 30 onto the screen, for example, from a direction A1 (e.g. in a slant direction), which is different form a perpendicular direction A2.

Referring to FIGS. 6 and 7, the pen tip unit 30 moves inward in the pen body housing 20 and the movement of the engagement portion 33 of the pen tip unit 30 rotates the contact point head 51. When the pen tip unit 30 and the contact point head 51 move together, the first engagement pin 81, which engages the engagement portion 33 of the pen tip unit 30 with the head engagement portion 51a of the contact point head 51, bends the contact point head 51 so that the contact point head 51 can make a rotational movement.

Referring to FIGS. 6 and 7, as the gap between the contact point head 51 and the contact point switch 52 is narrowed, the contact point head 51 is finally brought into a contact with the contact point switch 52. As a result, the contact point switch 52 is activated, thereby supplying power of the battery (not shown) to the light emitting device 40. Thereafter, the light emitting device 40 emits light C1. Even though the pen tip unit 30 is pressed from any angles and directions A1 other than the perpendicular direction A2, the convex semi-spherical contact point head 51 contacts the concave semi-spherical contact point switch 52 according to the inventive switching mechanism.

Referring to FIGS. 6 and 7, the light C1 of the light emitting device 40 is discharged to the outside through the light-emitting hole 32b of the pen tip unit 30 and projected onto the screen (not shown).

In this state, the user grabs the pen body housing 20 and puts down the pen tip unit 30 on the screen (not shown). An IR camera (not shown) senses the hand writing.

Referring to FIG. 4, when the user finishes writing, he or she removes the pen tip unit 30 from the screen. Then, the elastic member 70 between the pen tip unit 30 and the switch cover 53 returns the pen tip unit 30 and the contact point head 51 to their original positions via elastic force. As the contact point head 51 is removed from the contact point switch 52, the former is also electrically disconnected from the latter.

Thereafter, the contact point switch 52 is turned off, thus blocking power of the battery from the light emitting device 40. Therefore, the light emitting device 40 discontinues its operation and does not emit light C1. The IR camera does not sense the light emission.

Figure 5:
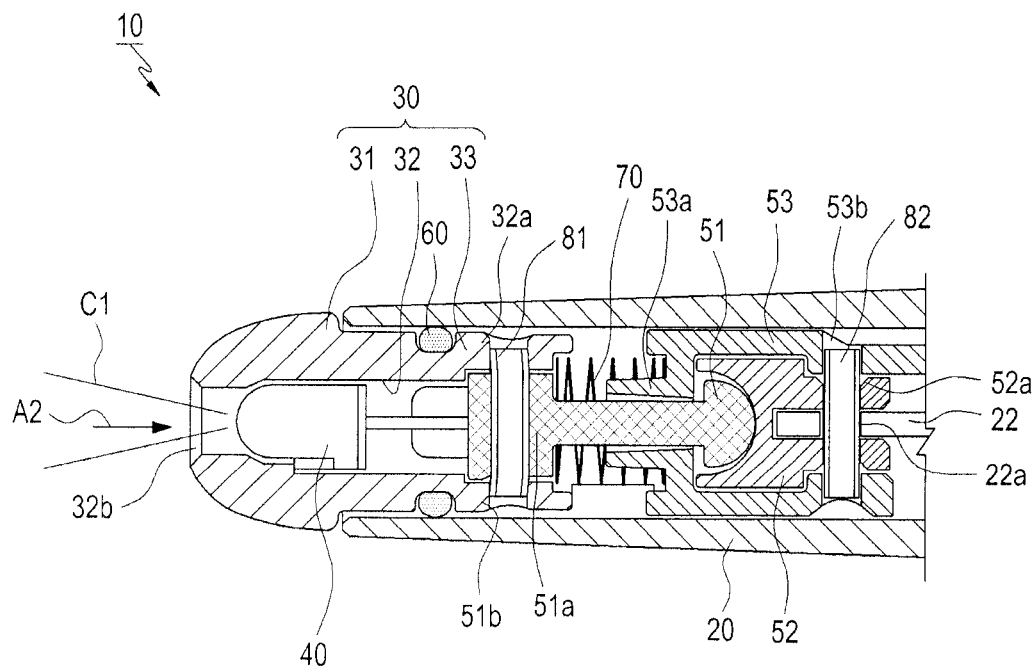
FIG. 5 is a side sectional view illustrating a state in which the electronic pen device is applied in a perpendicular direction according to the embodiment of the present invention.

Referring to FIGS. 4 and 5, when the user presses the pen tip unit 30 onto the projected screen from the perpendicular direction A2, the pen tip unit 30 moves inward in the pen body housing 20 and the movement of the engagement portion 33 of the pen tip unit 30 makes the contact point head 51 move linearly. When the pen tip unit 30 and the contact point head 51 move together, the first engagement pin 81, which engages the engagement portion 33 of the pen tip unit with the head engagement portion 51a of the contact point head 51, bends the contact point head 51 so that the contact point head 51 can make a linear movement.

Referring to FIG. 5, as the gap between the contact point head 51 and the contact point switch 52 is narrowed, the contact point head 51 is finally brought into a contact with the contact point switch 52. Then the contact point switch 52 is turned on, thereby supplying power of the battery (not shown) to the light emitting device 40. Thus, the light emitting device 40 emits light C1.

The light C1 of the light emitting device 40 is discharged to the outside through the light-emitting hole 32b of the pen tip unit 30 and projected onto the screen (not shown).

In this state, the user grabs the pen body housing 20 from the perpendicular direction A2 and puts down the pen tip unit 30 on the screen (not shown) in the perpendicular direction A2. Then, the IR camera (not shown) senses the hand writing.

Referring to FIG. 4, when the user finishes writing, he or she removes the perpendicularly pressed pen tip unit 30 from the screen.

As described above, when the user grabs the pen body housing 20 and presses the pen tip unit 30 in the perpendicular direction A2 or any other direction A1, the switch unit 50 electrically contacts the pen tip unit 30 and in turn activating the light emitting device 40. Accordingly, the IR camera can sense the user's handwriting through an electronic pen pressed onto the screen in the perpendicular direction A2 or in any other direction A1.

It should be noted that the electronic pen device 10 according to the embodiment of the present invention is applicable to an electronic blackboard, which should not be construed as limiting the present invention. Thus, the electronic pen device 10 can be used for a variety of products requiring it (e.g. an input/output device, a touch screen, a short-range communication device, a speaker, a transceiver, etc.).

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An electronic pen device, comprising:
  a pen body housing;
  a pen tip unit provided inside the pen body housing for being pressed in any of a plurality of directions via an external force;
  a light emitting device, the light emitting device being disposed inside the pen tip unit; and
  a switch unit selectively engaged with the pen tip unit for activating the light emitting device when the pen tip unit is pressed in any of the plurality of directions;
  wherein the pen tip unit is coupled to the switch via a mid-portion of a flexible first engagement pin, and
  wherein the first engagement pin extends across the pen tip unit and includes a first end and a second end that are engaged with the pen tip unit.

2. The electronic pen device of claim 1, wherein the pen body housing comprises:
  a battery housing a battery therein to supply power to the switch unit; and
  a Printed Circuit Board (PCB) provided inside the pen body housing for electrically connecting the switch unit to the battery.

3. The electronic pen device of claim 1, wherein the pen tip unit comprises:
  a semi-spherical contact portion for making a contact outside the electronic pen device;
  a mounting portion formed in the contact portion for mounting the light emitting device therein; and
  an engagement portion extended from the contact portion for engaging with the switch unit.

4. The electronic pen device of claim 3, wherein a light-emitting hole is formed in the mounting portion for projecting light to exterior.

5. The electronic pen device of claim 3, wherein a rubber portion is circumferentially provided at the exterior of the engagement portion for restricting pressure on the pen tip unit.

6. The electronic pen device of claim 1, wherein the switch unit comprises:
   a contact point head electrically coupled to the light emitting device and engaged with the pen tip unit for facilitating a linear or rotational movement along with the pen tip unit when the pen tip unit is pressed in any of the plurality of directions; and
   a contact point switch at a position corresponding to the contact point head electrically contacting the contact point head and selectively switching on or off the light emitting device.

7. The electronic pen device of claim 6, wherein the switch unit further comprises a switch cover for protecting the contact point head and the contact point switch and for supporting the linear or rotational movement of the contact point head.

8. The electronic pen device of claim 7, wherein a head guide is formed in the switch cover for guiding the linear or rotational movement of the contact point head.

9. The electronic pen device of claim 7, wherein an elastic member is interposed between the pen tip unit and the switch cover for providing an elastic force to enable the movement of the pen tip unit when the pen tip unit is pressed in any of the plurality of directions by the external force.

10. The electronic pen device of claim 6, wherein the contact point head is shaped into a convex semi-sphere.

11. The electronic pen device of claim 6, wherein the contact point switch is shaped into a concave semi-sphere to be engaged with and brought into contact with the contact point head.

12. The electronic pen device of claim 6, wherein the contact point head is apart from the contact point switch by 0.2 to 0.3 mm during an off mode.

13. The electronic pen device of claim 7, wherein the pen body housing includes a second engagement pin, a third engagement pin, and a fourth engagement pin.

14. The electronic pen device of claim 13, wherein the second engagement pin engages the contact point switch, the switch cover, and a PCB inside the pen body housing with one another, the third engagement pin engages the switch cover with the PCB, and the fourth engagement pin engages a battery housing with the switch cover.

15. The electronic pen device of claim 14, wherein when the pen tip unit and the contact point head move together as the pen tip unit is pressed in any of the plurality of directions, the first engagement pin bends the contact point head to allow the contact point head to make a linear or rotational movement.

16. The electronic pen device of claim 13, wherein the first engagement pin includes a C-shaped plate spring.

17. The electronic pen device of claim 1, wherein the light emitting device includes an InfraRed (IR) Light Emitting Diode (LED).

18. An electronic pen device comprising:
   a pen body housing;
   a pen tip unit having a semi-spherical contact portion provided inside the pen body housing for being pressed in any of a plurality of directions via an external force; and
   a switch unit having a contact point switch in a concave semi-spherical shape selectively engaged with the pen tip unit,
   wherein the switch is activated when the pen tip unit is pressed in any of the plurality of directions,
   wherein the pen tip unit is coupled to the switch via a mid-portion of a flexible first engagement pin, and wherein the first engagement pin extends across the pen tip unit and includes a first end and a second end that are engaged with the pen tip unit.

19. The electronic pen device of claim 18, wherein one end of the pen tip unit is apart from the contact point switch by 0.2 to 0.3 mm during an off mode.

20. The electronic pen device of claim 18, further comprising a light source provided inside the pen tip unit being activated when one end of the pen tip unit electrically contacts the switching unit.

21. An electronic pen device, comprising:
   a pen body housing;
   a pen tip unit provided inside the pen body housing for being pressed in any of a plurality of directions via an external force;
   a light emitting device, the light emitting device being disposed entirely inside the pen tip unit; and
   a switch unit selectively engaged with the pen tip unit for activating the light emitting device when the pen tip unit is pressed in any of the plurality of directions,
   wherein the switch is engaged with the pen tip unit via a mid-portion of a flexible first engagement pin, and wherein the first engagement pin extends across the pen tip unit and includes a first end and a second end that are engaged with the pen tip unit.

* * * * *